May 26, 1953
W. H. PECK
2,639,636
POWER-OPERATED, PREDETERMINED TORQUE RELEASE WRENCH
Filed March 8, 1951
2 Sheets-Sheet 1
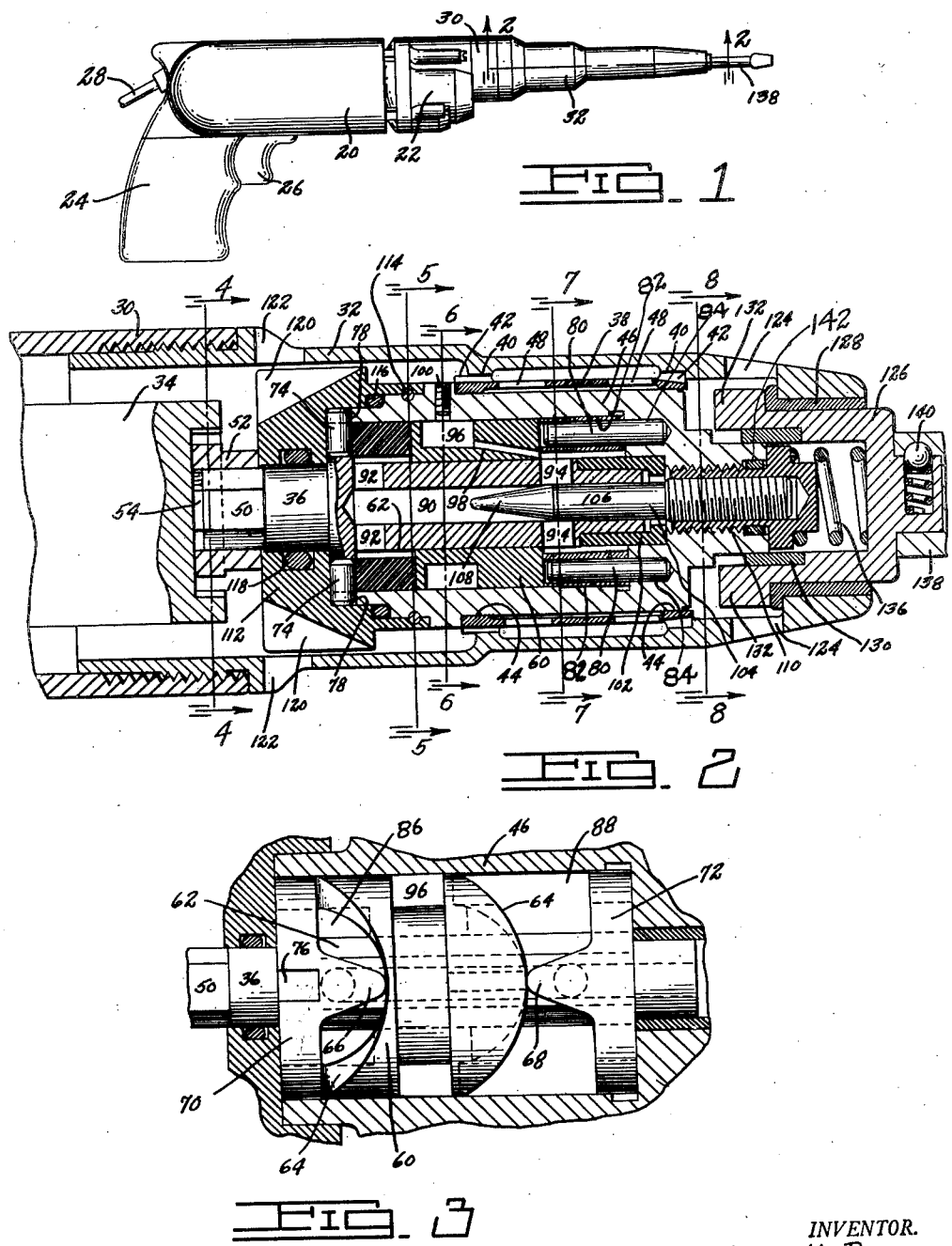
INVENTOR.
WILLIAM H. PECK
BY
Ralph W. Yates
ATTORNEY

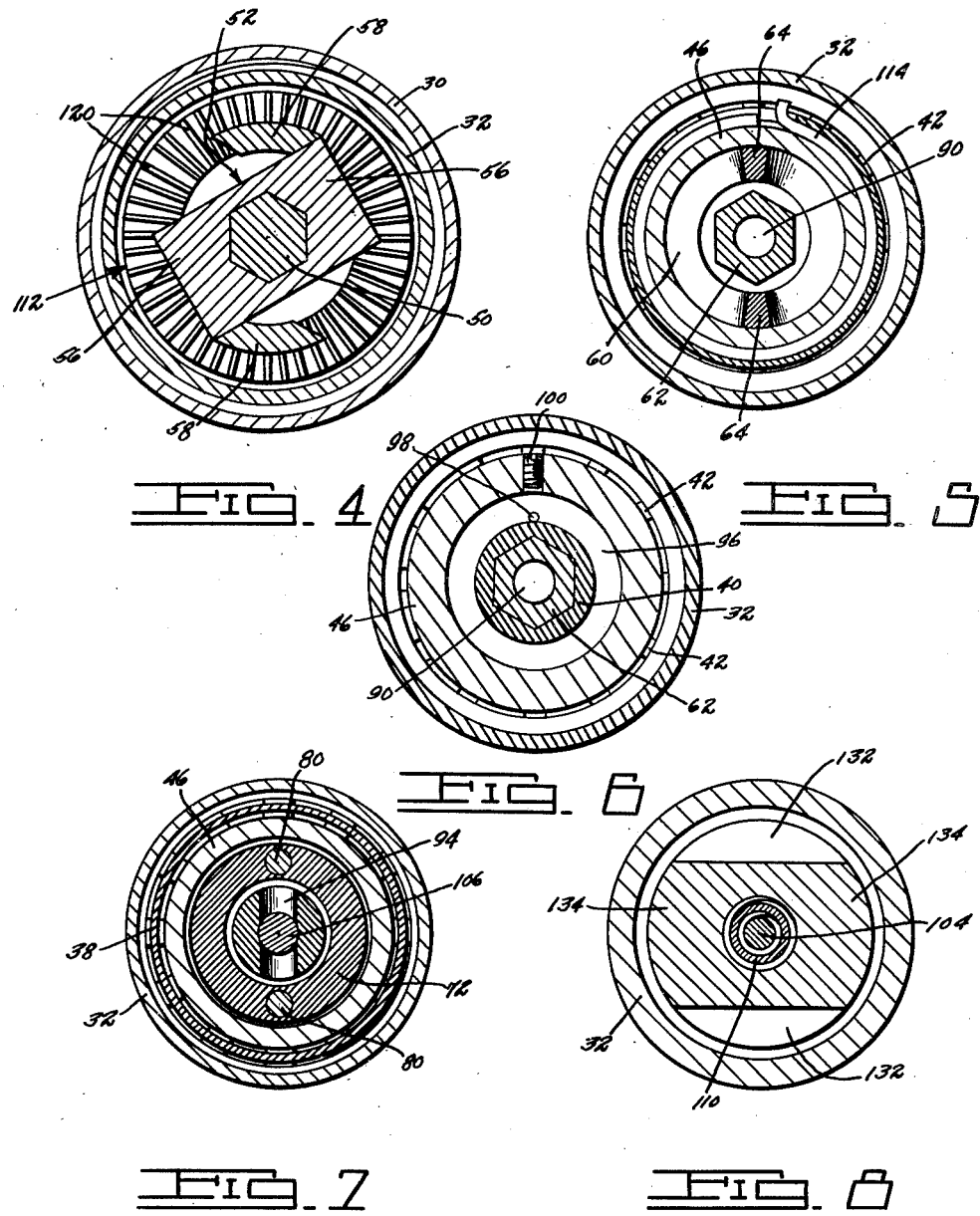

Patented May 26, 1953

2,639,636

UNITED STATES PATENT OFFICE 2,639,636

POWER-OPERATED, PREDETERMINED TORQUE RELEASE WRENCH

William H. Peck, Royal Oak, Mich.

Application March 8, 1951, Serial No. 214,485

7 Claims. (Cl. 81—52.4)

This invention relates to a tool and more particularly to a power driven tool for turning nuts, bolts, screws and the like, commonly referred to as a torque wrench. More specifically, the invention relates to improvements in a device disclosed in my pending application, Serial Number 138,348, filed January 13, 1950.

It is an object of the present invention to provide a power driven tool wherein torque power, used in turning the work, is dissipated or utilized for producing reciprocating movement of a part, upon reaching a predetermined resistance, so that the turning force is arrested after a predetermined power has been reached.

Another object of the invention is to provide improved means for varying the torque resistance so that the operator may have a selection of torque power ranges.

A further object of the invention is to provide improved cooling means for the working parts of the device to remove the heat generated by the conversion of torque motion into reciprocating motion.

A still further object of the invention is to provide an arrangement of parts which may be easily assembled, adjusted, and one in which the parts may be economically manufactured.

Other objects and advantages of the invention will more fully appear from the following description taken in connection with the accompanying drawings, in which:

Fig. 1 is a side elevational view of a tool embodying the improvements of my invention;

Fig. 2 is an enlarged sectional view, taken on line 2—2 of Fig. 1, showing the working parts of the device;

Fig. 3 is a fragmentary view, partly in section, showing the reciprocating member and its cam follower members in side elevation;

Fig. 4 is a cross sectional view taken on line 4—4 of Fig. 2;

Fig. 5 is a cross sectional view taken on line 5—5 of Fig. 2;

Fig. 6 is a cross sectional view taken on line 6—6 of Fig. 2;

Fig. 7 is a cross sectional view taken on line 7—7 of Fig. 2; and

Fig. 8 is a cross sectional view taken on line 8—8 of Fig. 2.

Referring to the drawings, I have shown the tool having a body portion 20 in which an electric motor is mounted for power driving means to a transmission housing 22. The body portion 20 is provided with a handle 24, a finger control switch 26, and an electrical lead 28. The transmission housing 22 is provided with an internally threaded sleeve 30 which receives the housing of my improved device.

A casing 32, enclosing the working parts of the mechanism, is screw threaded into the sleeve 30. A drive shaft 34, in the transmission housing 22, is adapted for driving engagement with the drive shaft 36 of the driven torque conversion mechanism, shown in the form of an adapter to be applied to the power driving means.

The adapter has a cylindrical sleeved bushing 38 fitting the interior of the casing 32. The inner periphery of the casing 32 is provided with inwardly extending shoulders 40 which receive slotted flanges 42 extending outwardly from the outer periphery of the bushing 38. The bushing 38 is also provided with inwardly extending flanges 44 at its opposite ends for supporting a rotatable sleeve member 46. The major portion of the wall of the bushing 38 is spaced from the inner periphery of the casing 32 and from the outer periphery of the rotatable member 46 and the wall is provided with openings 48 therethrough. The openings 48 together with the slotted flanges 42 provide for a circulation of air around the rotatable member 46 and between the member 46 and casing 32 for cooling.

The shaft 36, at its inner end, has a hexagonal portion 50 which receives a coupling 52. The coupling 52 has a hexagonal opening 54 which fits over the hexagonal end 50 and also has oppositely and radially extending flanges 56 which form driving lugs for engagement with driving lugs 58 carried by the drive shaft 34 of the transmission.

The shaft 36 has its main body portion formed for driving connection with a sliding piston 60. This driving connection is shown as a hexagonal portion 62 slidably fitting a correspondingly shaped inner surface of the piston 60, but the shaft and piston may have the usual spline connection or other drive means which will permit relative sliding movement of the piston on the shaft. The opposite end faces of the piston 60 are provided with cam tracks 64 which engage cam followers 66 and 68 on insert rings 70 and 72. The rings 70 and 72 are rotatable relative to the shaft 36 but are keyed to the rotatable member 46, the ring 70 held to the rotatable member 46 by pins 74 in slots 76 and 78 of ring 70 and member 46, and by pins 80 in aligned apertures 82 and 84 in the ring 72 and member 46.

The cam followers 66 and 68 space the rings 70 and 72 from the opposite ends of the piston 60 providing fluid chambers 86 and 88 which are intercommunicating through a longitudinal passage 90, in the shaft 36, and radially extending passages 92 and 94 through the wall of the shaft 36. A groove 96 in the outer periphery of the piston 60 forms a fluid reservoir which is in communication with one of the chambers 86 or 88 by a passage 98, here shown connected to the chamber 94. A filler plug 100 in the rotatable member 46 provides a means for supplying fluid to the chambers 86, 88 and reservoir 96. The filler plug 100 further provides a means for removing the air from the chambers and passages when the fluid is supplied to the chambers.

The outer end of the shaft 36 is journaled in a bushing 102 carried by the rotatable member 46.

The longitudinal passage 90 extends through the outer end of the shaft 36 and receives a needle valve 104 having a cylindrical shank portion 106 and a tapered inner end portion 108. The needle valve 104 is screw-threaded into a plug 110 which is screw-threaded into the outer end of the rotatable member 46. The plug 110 may be removed with the needle valve 104 and the axial position of the needle valve may be adjusted relative thereto so that when the plug and needle valve are in position the amount of flow from passage 90 to passage 94, or from passage 94 to passage 90, may be predetermined dependent upon the position of tapered end portion 108 of the needle valve with respect to the passage 94.

At the inner end of the rotatable member 46 is a cylinder cap 112, held on the member 46 by a C ring 114 fitting oppositely positioned grooves in the member 46 and the cap 112. Sealing gaskets 116 and 118 are provided between the member 46 and the cap 112 to seal the fluid chambers 90, 92, 94 and 96 against fluid leak. A plurality of fins 120 are provided on the cap 112 to create a circulation of air through the casing 32. Openings 122 and 124 are provided for admitting and expelling the air which, as before stated, is permitted to flow through the slots 42 and openings 48 of the bushing.

At the outer end of the casing 32 is a sliding tool supporting member 126, journaled in a bushing 128. There is also a bearing 130 between the tool supporting member 126 and the outer end of the rotatable housing 46. The inner end of the tool supporting member is provided with jaw clutch members 132, better shown in Fig. 8, for engaging jaw clutch members 134 on the outer end of the rotatable member 46. A compression spring 136 between the outer end of the plug 110 and the tool supporting member 126 normally holds the jaw clutch members disengaged so that driving torque from the rotatable member 46 is not transmitted to the tool supporting member 126. The tool 138, herein shown as a screw driver, has a driving connection with the outer end of the tool supporting member and is retained thereon by a spring pressed ball 140 between the tool and the tool supporting member. When it is desired to drive the tool from the rotatable member 46 axial pressure is applied to the tool and the tool supporting member moves inwardly and the jaw clutches are interengaged.

A sealing gasket 142 is provided between the plug 110 and the rotatable member 46 to prevent fluid leak from the fluid chambers 90, 92, 94 and 96.

Assuming now that it is desired to drive the tool under full torque load, the needle valve 104 is adjusted to an axial position where the cylindrical shank portion 106 of the valve completely closes the radial passages 94 so that no fluid can be moved from one chamber 88 to the other chamber 86. This balanced pressure in the two chambers prevents axial movement of the piston 60. The torque of the drive shaft 34 then rotates the shaft 36, through coupling 52, and the shaft 36 in turn rotates the piston 60. Since the piston 60 can not be moved axially due to the static fluid in the chambers 86 and 88 the torque force of the piston 60 rotates the rings 70 and 72 through cams 64 and their respective followers 66 and 68. The rings 70 and 72 are keyed to the rotatable member 46 and impart a turning force to the member 46 which rotates the tool 138 when the jaw clutch members 132 and 134 are engaged by the axial pressure above referred to.

Now, if it is desired to reduce the torque force to a predetermined force applied to the tool from that of the torque force of the driving member, the needle valve 104 is adjusted, so that the tapered portion 108 will permit a flow of fluid through the passage 94 to the chamber 90, passage 92 and chamber 86, or in a reverse direction to the chamber 88. This will permit the piston to reciprocate on the shaft 36 by moving the fluid from one of the chambers 86 or 88 to the other. When the piston 60 is permitted to reciprocate there is no rotary movement applied to the rings 70 and 72 and the rotatable member is not rotated. The torque power is thus converted from rotary movement of the piston to reciprocating movement and the rotatable member is not rotated, consequently there is no additional torque applied to the tool.

Thus, by adjusting the position of the needle valve 104 with respect to the flow of fluid past the valve 104 the torque from the driving member 34, transmitted to the tool, may be predetermined without varying the torque input.

While I have illustrated and described a preferred embodiment of my invention, it will be understood that various changes, including the size, shape and arrangement of parts, may be made without departing from the spirit of my invention, and it is not my intention to limit its scope other than by the terms of the appended claims.

I claim:

1. A tool for transmitting torque power to a work piece comprising, a rotatable driven shaft, a sleeve member rotatably supported on said shaft and surrounding a portion of said shaft, a piston having its outer periphery slidably fitted to the inner periphery of said sleeve, said piston being rotatable by said shaft and axially slidable thereon, end walls fixed to said sleeve forming with said shaft and said sleeve a fluid chamber at each of the ends of said piston, a cam track on each end face of said piston, a cam follower on each end wall in co-operative engagement with said cam track, said fluid chambers having an intercommunicating fluid passage, means for restricting the fluid flow through the fluid passage, and a work piece carried by said sleeve.

2. A tool for transmitting torque power to a work piece comprising, a rotatable driven shaft, a sleeve member rotatably supported on said shaft and surrounding a portion of said shaft, a piston having its outer periphery slidably fitted to the inner periphery of said sleeve, said piston being rotatable by said shaft and axially slidable thereon, end walls fixed to said sleeve forming with said shaft and said sleeve a fluid chamber at each of the ends of said piston, a cam track on each end face of said piston, a cam follower on each end wall in co-operative engagement with said cam track, said fluid chambers having an intercommunicating fluid passage, variable means for restricting the fluid flow through the fluid passage, and a work piece carried by said sleeve.

3. A tool for transmitting torque power to a work piece comprising, a rotatable driven shaft, a sleeve member rotatably supported on said shaft and surrounding a portion of said shaft, a piston having its outer periphery slidably fitted to the inner periphery of said sleeve, said piston being rotatable by said shaft and axially slidable thereon, end walls fixed to said sleeve forming with said shaft and said sleeve a fluid chamber at each of the ends of said piston, a cam track on each end face of said piston, a cam follower on each end wall in co-operative engagement with said cam track, said cam followers being in axial alignment, said fluid chambers having an intercommunicating fluid passage, means for restricting the fluid flow through the fluid passage, and a work piece carried by said sleeve.

4. A torque inverter comprising, a power drive shaft, a driven sleeve surrounding said shaft, a piston rotatably driven by said drive shaft and axially slidable on said shaft and within said driven sleeve, said piston forming with said sleeve and said shaft a fluid chamber at the opposite ends of said piston, a cam track at the opposite ends of said piston, cam followers fixed to said sleeve in co-operation with said cam tracks, a fluid passage for conducting fluid from one of said fluid chambers to the other, and valve means for regulating the flow of fluid through said passage.

5. A torque inverter comprising, a power drive shaft, a driven sleeve surrounding said shaft, a piston rotatably driven by said drive shaft and axially slidable on said shaft and within said driven sleeve, said piston forming with said sleeve and said shaft a fluid chamber at the opposite ends of said piston, a cam track at the opposite ends of said piston, cam followers fixed to said sleeve in co-operation with said cam tracks, a fluid reservoir carried by said piston having a passage communicating with one of said chambers, a fluid passage for conducting fluid from one of said fluid chambers to the other, and valve means for regulating the flow of fluid through said passage.

6. A device for transmitting torque power to a rotatable tool comprising, a driven rotatable shaft, a sleeve surrounding said shaft and rotatable relative thereto, a slidable piston rotated by said shaft and axially movable thereon, said piston dividing the space between said sleeve and said shaft into fluid chambers, one at each end of said piston, correspondingly shaped cam tracks, one at each end of said piston, a projection on the end wall of each chamber cooperating with an adjacent cam track for reciprocating said piston by relative rotation of said piston and said projections, a fluid passage forming a communication between the chambers, and an adjustable valve for regulating the flow of fluid through said passage.

7. A device for transmitting torque power to a rotatable tool comprising, an outer casing, a rotatable sleeve within said casing, a drive shaft within said sleeve, a piston rotatable with said drive shaft and slidable on said shaft and within said sleeve, cam means for reciprocating said piston by relative rotation of said piston and said sleeve, variable resistance means for preventing relative rotation of said piston and said sleeve, and a perforated bushing forming the bearing between said casing and said sleeve, said bushing being longitudinally slotted to permit a circulation of air through said bushing between said sleeve and said casing.

WILLIAM H. PECK.

References Cited in the file of this patent

UNITED STATES PATENTS

| Number | Name | Date |
| --- | --- | --- |
| 2,384,399 | Reynolds | Sept. 4, 1945 |
| 2,398,392 | Page | Apr. 16, 1946 |
| 2,565,579 | Thorner | Aug. 28, 1951 |

FOREIGN PATENTS

| Number | Country | Date |
| --- | --- | --- |
| 53,643 | Netherlands | Dec. 15, 1942 |